(12) United States Patent
Persson et al.

(10) Patent No.: US 10,752,142 B2
(45) Date of Patent: Aug. 25, 2020

(54) ELECTRICAL HEATING ASSEMBLY

(71) Applicant: Kongsberg Automotive AB, Mullsjö (SE)

(72) Inventors: Mattias Persson, Jönköping (SE); Daniel Josefsson, Falköping (SE)

(73) Assignee: Kongsberg Automotive AB, Mullsjö (SE)

( * ) Notice: Subject to any disclaimer, the term of this patent is extended or adjusted under 35 U.S.C. 154(b) by 314 days.

(21) Appl. No.: 15/737,977

(22) PCT Filed: Jul. 1, 2015

(86) PCT No.: PCT/EP2015/001332
§ 371 (c)(1),
(2) Date: Dec. 19, 2017

(87) PCT Pub. No.: WO2017/000970
PCT Pub. Date: Jan. 5, 2017

(65) Prior Publication Data
US 2018/0297498 A1    Oct. 18, 2018

(51) Int. Cl.
*B60N 2/56* (2006.01)
*H05B 3/34* (2006.01)
*H05B 3/36* (2006.01)

(52) U.S. Cl.
CPC .............. *B60N 2/5685* (2013.01); *H05B 3/34* (2013.01); *H05B 3/36* (2013.01);
(Continued)

(58) Field of Classification Search
CPC ........... B60N 2/5685; H05B 3/34; H05B 3/36
(Continued)

(56) References Cited

U.S. PATENT DOCUMENTS 7,714,256 B2 * 5/2010 Weiss .................... B60N 2/5685
219/528
8,106,338 B2 * 1/2012 Weiss .................... B60N 2/5685
219/528
(Continued)

FOREIGN PATENT DOCUMENTS

DE     102005003946 A1    8/2006
EP         0939579 A1    9/1999
(Continued)

OTHER PUBLICATIONS

International Search Report for Application No. PCT/EP2015/001331 dated Mar. 7, 2016, 3 pages.
(Continued)

*Primary Examiner* — Jennifer C Chiang
(74) *Attorney, Agent, or Firm* — Howard & Howard Attorneys PLLC

(57) ABSTRACT

An electrical heating assembly (1), in particular for use in a heatable seat device, comprises a plurality of heating wires (11, 12, 13, 14, 15) and a support structure (8) adapted to fix the heating wires (11, 12, 13, 14, 15). The heating wires (11, 12, 13, 14, 15) are arranged to form a plurality of hot points (10), a respective hot point (10) being defined by a circular area of 6 mm in diameter in which there are present at least three sections of heating wire (11, 12, 13, 14, 15) which are not interconnected to each other within the area of the hot point (10).

17 Claims, 2 Drawing Sheets

Figure 1:
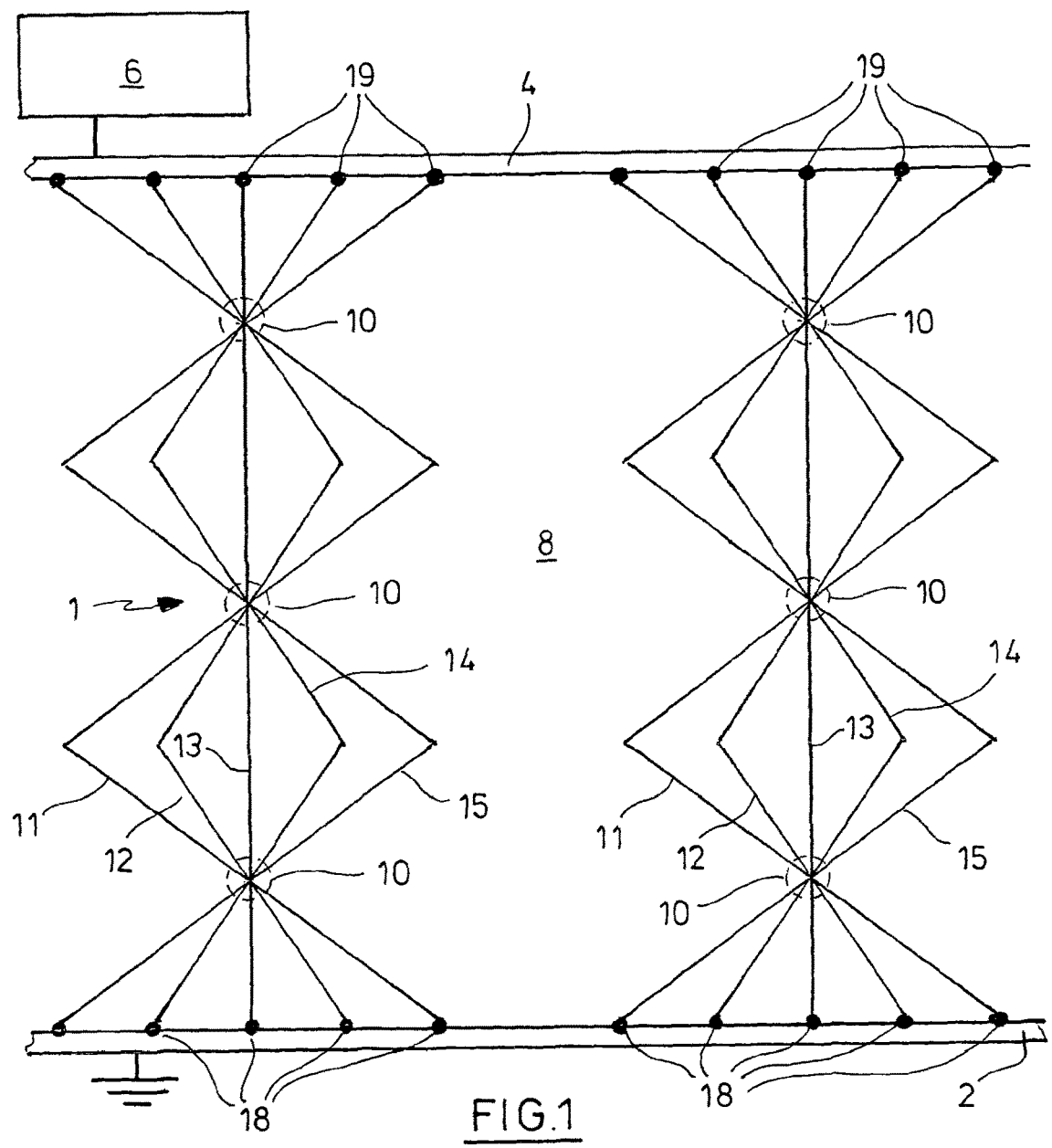

(52) U.S. Cl.
 CPC .. *H05B 2203/004* (2013.01); *H05B 2203/007* (2013.01); *H05B 2203/029* (2013.01); *H05B 2203/037* (2013.01)

(58) Field of Classification Search
 USPC .................................................. 219/528, 529
 See application file for complete search history.

(56) References Cited

U.S. PATENT DOCUMENTS

| | | | |
|---|---|---|---|
| 8,704,140 B2* | 4/2014 | Kapp | ........................ H05B 3/34 |
| | | | 219/202 |
| 9,191,997 B2* | 11/2015 | Weiβ | ................... B60N 2/5685 |
| 2007/0278210 A1 | 12/2007 | Weiss | |
| 2010/0089894 A1 | 4/2010 | Richmond | |
| 2014/0091081 A1 | 4/2014 | Miyahara et al. | |

FOREIGN PATENT DOCUMENTS

| | | |
|---|---|---|
| EP | 1132028 A1 | 9/2001 |
| EP | 2575409 A1 | 4/2013 |
| GB | 1284385 A | 8/1972 |
| GB | 1309515 A | 3/1973 |
| WO | 2013177257 A1 | 11/2013 |
| WO | 2014111740 A1 | 7/2014 |
| WO | 2017000969 A1 | 1/2017 |

OTHER PUBLICATIONS

International Search Report for Application No. PCT/EP2015/001332 dated Mar. 11, 2016, 3 pages.

English language abstract and computer-generated English language translation for DE102005003946A1 extracted from espacenet.com database on Jan. 18, 2018, 9 pages.

English language abstract and computer-generated English language translation for EP0939579A1 extracted from espacenet.com database on Jan. 18, 2018, 7 pages.

English language abstract and computer-generated English language translation for EP2575409A1 extracted from espacenet.com database on Jan. 18, 2018, 9 pages.

* cited by examiner

ELECTRICAL HEATING ASSEMBLY

The subject application is the National Stage of International Patent Application No. PCT/EP2015/001332, filed on Jul. 1, 2015, the contents of which are incorporated herein by reference in their entirety.

The invention relates to an electrical heating assembly, which can be used, e.g., in a heatable seat device for a vehicle.

WO 2014/111740 A discloses a seat device which comprises a heating element disposed along a predetermined path in a zone of a bottom seating surface or back seating surface. The heating element provides electrical heating of variable temperature along the predetermined path. To this end, the heating element includes first and second sections continuously alternating along the predetermined path. An electrical conductor extending along the whole path forms the only heating resistor in the second sections. In the first sections, additional conductors are arranged in parallel so that the resistance per unit length in the first sections is considerably smaller than that in the second sections. This results in heating temperatures which are greater in the second sections than in the first sections. The second sections form relatively short gaps between the first sections, thus providing a kind of point-like heating effect. Generally, compared to a conventional heating element using a heating wire having a constant resistance per unit length, the power consumption of the heating element described in WO 2014/111740 A is smaller, it heats up more quickly, and its temperature distribution may be regarded as more convenient. A disadvantage, however, is the expenditure in manufacturing, which results in relatively high costs.

The object of the invention is to provide an electrical heating assembly, in particular for use in a heatable seat device, which exhibits a similar "hot point" heating effect, but is less expensive in manufacturing.

This object is achieved by the electrical heating assembly defined in claim 1. Advantageous versions of the invention follow from the dependent claims.

The electrical heating assembly according to the invention comprises a plurality of heating wires and a support structure adapted to fix the heating wires. The heating wires are arranged to form a plurality of "hot points". In this context, a respective hot point is defined by a circular area of 6 mm in diameter in which there are present at least three sections of heating wire which are not interconnected to each other within the area of the hot point. The electrical heating assembly according to the invention can be used, e.g., in a heatable seat device, in particular in a vehicle or automotive. In advantageous embodiments, the heating wires are placed in a generally areal arrangement.

In the hot points, the areal density of heating wire (expressed as total length of heating wire present in a certain area divided by that area) is generally greater than in other regions of the electrical heating assembly. Assuming that the heating wires of the assembly have a given resistance per unit length and that they are passed by equal electrical currents, the power dissipated per unit length of heating wire will be the same for all heating wires. However, because of the higher concentration of heating wire in the hot points, the power dissipated per unit area will be generally greater in the hot points than elsewhere in the electrical heating assembly. This provides the desired "hot point" heating effect and has the general advantages of the heating assembly disclosed in WO 2014/111740 A. On the other hand, manufacture of the electrical heating assembly according to the invention is generally easier and less expensive than that of the prior art assembly. These considerations will also hold in general if the individual heating wires do not have the same resistance per unit length or if they are not passed by the same electrical currents.

In advantageous embodiments of the invention, at least two sections of heating wire cross each other, in at least one hot point. These sections of heating wire may be formed from different heating wires. It is also possible, however, that they derive from the same heating wire and are connected to each other outside the area of the hot point considered. Moreover, for achieving a hot point effect, it may be sufficient if the sections of heating wire approach each other by some relatively small distance within the area of the hot point considered, but do not cross each other. Any mixtures of such options are conceivable as well.

The wiring of the electrical heating assembly according to the invention will be facilitated if it comprises two bus supplies, wherein the heating wires are electrically connected in parallel between the bus supplies. In this context, a bus supply is an electrical conductor having a low resistance, compared to the heating wires. One of the bus supplies can be grounded, the other one connected to a voltage, e.g. via a controller used to control the electrical heating assembly, e.g. in response to temperatures measured by at least one temperature sensor.

At least two heating wires may emerge from a common connection at a bus supply. Even a bunch of heating wires may emerge from just one common connection point at the bus supply. In this way, the total number of connection points between heating wires and bus supplies can be considerably reduced, which minimises the effort of preparing such connections (e.g., by soldering, welding or wrapping).

The heating wires may be electrically insulated, e.g. enamel-insulated. This is advantageous to avoid any shorts, in particular if the heating wires cross each other.

The heating wires can be designed as a single wire (monofilament) or as a stranded wire. In the latter case, a stranded heating wire as a whole may comprise a common insulating layer or each of its individual filaments may be insulated, e.g. by a coating (lacquered).

The heating wires may comprise a material like a stainless steel, a carbon steel and/or a metal alloy having a high electrical resistivity, as generally known in the art, but the use of other metals, e.g. copper, is conceivable as well. The choice of material depends on design parameters like desired power dissipation per unit length of heating wire, total length and cross-sectional area of the heating wires, and costs. Designs in which the individual heating wires are not of the same type or do not have the same parameters are generally possible.

The distance between neighbouring hot points may be at least 10 mm. Generally, the optimal distance depends on the kind of application and parameters like the heat capacity and thermal conductivity of the device where the electrical heating assembly is built in. The distance between neighbouring hot points may be selected, e.g., from one of the following ranges: 10 mm to 20 mm, 20 mm to 40 mm, 40 mm to 60 mm, 60 mm to 100 mm, 100 mm to 150 mm, 150 mm to 200 mm.

The support structure adapted to fix the heating wires can be designed in various ways. In advantageous embodiments, which provide some flexibility in an areal basic structure, the support structure comprises a fabric where at least one of the heating wires is fixed by use of a thread. For example, an electrically insulated fabric layer is used as a backing, two bus supplies are fixed on the backing by means of metal clamps or rivets, and the heating wires are soldered to the bus supplies and run between the bus supplies on zigzag paths, thus forming the hot points, wherein the heating wires are fixed to the backing by sewing or embroidering techniques.

The electrical heating assembly may further comprise a temperature controller (see above), as well known in the art. In an application, the electrical heating assembly according to the invention is adapted for fitting in the seat bottom and/or the seat back of a vehicle seat. In this case, the hot points may be generally evenly distributed over an area of the seat bottom and/or the seat back, but other distributions (preferably as a two-dimensional array) are conceivable as well. The arrangement of the hot points may be similar to that of the higher-temperature zones in the seat assembly disclosed in WO 2014/111740 A.

In the following, the invention is further described by means of embodiments. The drawings show in FIG. 1 a schematic representation of an embodiment of an electrical heating assembly according to the invention, FIG. 2 a close-up view of a hot point in the embodiment of FIG. 1, FIG. 3 a close-up view of a hot point in another embodiment of the invention and FIG. 4 a schematic representation of a further embodiment of an electrical heating assembly according to the invention in a view similar to FIG. 1.

FIG. 1 schematically illustrates an embodiment of an electrical heating assembly 1.

The electrical heating assembly 1 comprises a bus supply 2 serving as a ground terminal and a bus supply 4 serving as a voltage terminal. The bus supplies 2 and 4 are made, e.g., from copper bars and have a low electrical resistance. The bus supply 4 is connected to a controller 6 which, in the embodiment, may adjust the voltage supplied to the bus supply 4 in response to temperatures measured by at least one temperature sensor (non shown in FIG. 1) placed at the electrical heating assembly 1.

The bus supplies 2 and 4 are fixed to a support structure 8. In the embodiment, the support structure 8 comprises a fabric sheet of electrically insulating material. For fixing the bus supplies 2 and 4, fixing means like rivets, metal clips or textile threads can be used.

FIG. 1 shows some areas indicated by a respective dashed circle and reference numeral 10. By definition, these areas are designated as "hot points" and have a diameter of 6 mm. The area of each hot point 10 is traversed by, in the embodiment, a total of five sections of heating wires 11, 12, 13, 14 and 15, which extend in parallel between the bus supplies 2 and 4 in a zigzag pattern, see FIG. 1, and are connected to the bus supplies 2 and 4 at connections 18 and 19, respectively, e.g. by soldering, welding or wrapping. FIG. 1 displays two arrays of heating wires 11, 12, 13, 14, 15, each array forming three hot points 10, i.e. one array in the left part and one array in the right part of FIG. 1. In practice, the electrical heating assembly 1 may comprise more (or even considerably more) than two of such arrays and each array may form more than three hot points 10.

Figure 2:
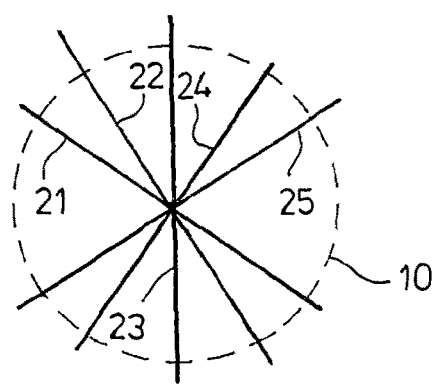

FIG. 2 illustrates one of the hot points 10 of FIG. 1 in a larger scale. In the area of the hot point 10, there are present five sections 21, 22, 23, 24 and 25 of heating wire. In the context of FIG. 1, each of these sections belongs to one of the heating wires 11, 12, 13, 14 and 15. Within the area of the hot point 10, the sections 21, 22, 23, 24, 25 are not interconnected to each other.

The heating wires 11, 12, 13, 14, 15 are fixed to the support structure 8, e.g., by stitching, sewing, weaving or other means, preferably by textile techniques using threads. Preferably, the heating wires 11, 12, 13, 14, 15 are electrically insulated, e.g. by means of an enamel coating.

When the electrical heating assembly 1 is operated, an electrical current runs through each of the heating wires 11, 12, 13, 14, 15 and heats up the respective heating wire. In the hot points 10, the areal density of heating wire is relatively large, as evident from FIG. 1, which results in a higher temperature than in the areas away from the hot points 10. The material and cross-sectional area of the heating wires 11, 12, 13, 14, 15 can be selected so that, depending on the length of the heating wires and the electrical voltage supplied, a desired power dissipation along each heating wire is achieved.

Figure 3:
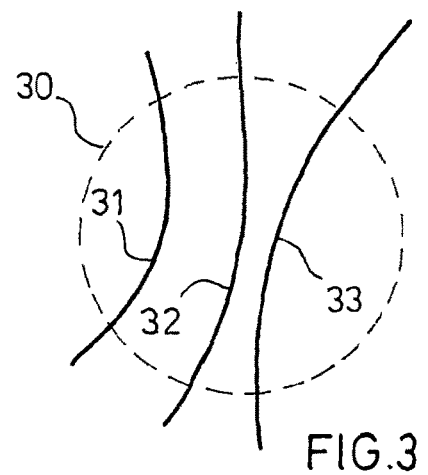

FIG. 3 displays a hot point 30 of another embodiment of an electrical heating assembly. In this case, the area of the hot point 30 is traversed by sections 31, 32 and 33 of heating wire, which do not cross each other, however. These sections 31, 32, 33 may belong to different heating wires. They may also be part of the same heating wire, if this heating wire meanders and the sections 31, 32, 33 are connected to each other outside the area of the hot point 30.

Figure 4:
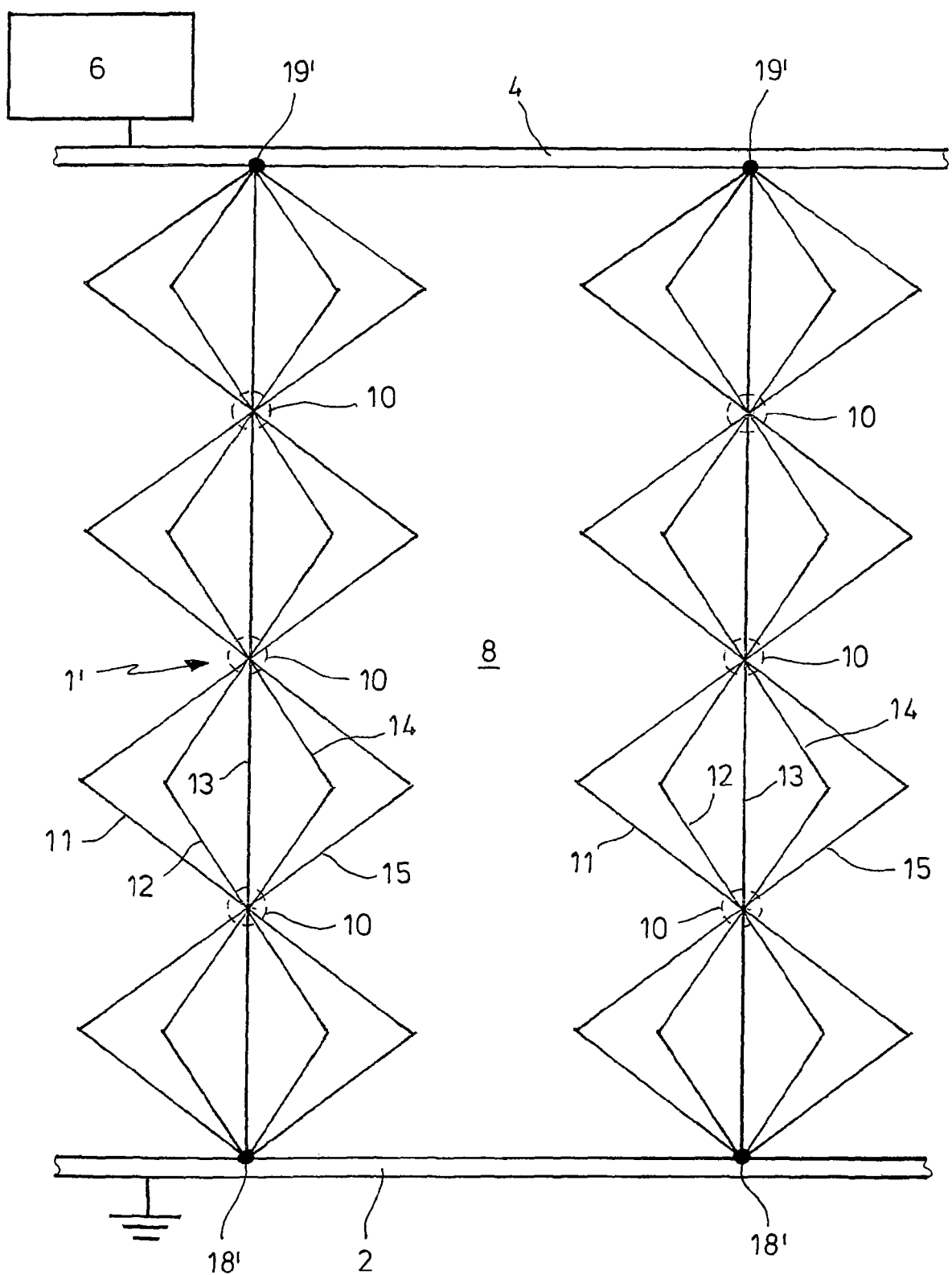

FIG. 4 illustrates another embodiment of an electrical heating assembly, which is designated by reference numeral 1'. Because of its similarity to the electrical heating assembly 1, in FIG. 4 the same reference numerals are used as in FIG. 1. The main difference between both embodiments relates to the manner of how the individual heating wires 11, 12, 13, 14, 15 of each array are connected to the bus supplies 2 and 4. In the embodiment of FIG. 1, there is an individual connection 18 or 19, respectively, for each heating wire 11, 12, 13, 14, 15. In the embodiment of FIG. 4, all the heating wires of a given array are connected together to the respective bus supply 2, 4 at a common connection 18' or 19', respectively. In this way, the total number of connections can be considerably reduced, in a comparison of the embodiments of FIG. 1 and FIG. 4 by a factor of 5. At the common connections 18' and 19', the areal density of heating wire is relatively high, which may result in a temperature rise. If such a hot point effect at the common connections 18' and 19' is not desired, the bus supplies 2 and 4 can have a high thermal conductance so that excessive heat is distributed along the bus supplies 2 and 4.

An electrical heating assembly 1 or 1' (or a corresponding one having more hot points than shown in FIGS. 1 and 4, respectively) can be mounted in a seat bottom and/or a seat back of a vehicle seat, e.g. in an automotive, as generally well known in the art. In an embodiment, the hot points 10 are largely evenly distributed over the area of the seat bottom and the area of the seat back, except for non-heated stripes at the longitudinal side areas of the seat bottom and the seat back.

The invention claimed is:

1. An electrical heating assembly for use in a heatable seat device, comprising:
   a plurality of heating wires; and
   a support structure adapted to fix the plurality of heating wires, wherein the plurality of heating wires is arranged to form a plurality of hot points with each hot point being defined by a circular area of 6 mm in diameter in which within the area of the hot point there are present at least three sections of the plurality of heating wires which are not interconnected to each other.

2. The electrical heating assembly of claim 1, wherein the plurality of heating wires is placed in a generally areal arrangement.

3. The electrical heating assembly of claim 1, wherein in at least one of the plurality of hot points, at least two sections of the plurality of heating wires cross each other.

4. The electrical heating assembly of claim 1, wherein in at least one of the plurality of hot points, at least two sections of the plurality of heating wires are formed from different heating wires.

5. The electrical heating assembly of claim 1, further comprising two bus supplies, wherein the plurality of heating wires is electrically connected in parallel between the bus supplies.

6. The electrical heating assembly of claim 5, wherein at least two of the plurality of heating wires emerge from a common connection at least one of the bus supplies.

7. The electrical heating assembly of claim 1, wherein at least one of the plurality of heating wires is electrically insulated.

8. The electrical heating assembly of claim 7, wherein the at least one of the plurality of heating wires is enamel-insulated.

9. The electrical heating assembly of claim 1, wherein at least one of the plurality of heating wires is designed as a stranded wire comprising a plurality of filaments.

10. The electrical heating assembly of claim 1, wherein a distance between neighbouring hot points of the plurality of hot points is at least 10 mm.

11. The electrical heating assembly of claim 1, wherein a distance between neighbouring hot points of the plurality of hot points is selected from 10 mm to 20 mm, 20 mm to 40 mm, 40 mm to 60 mm, 60 mm to 100 mm, 100 mm to 150 mm, and 150 mm to 200 mm.

12. The electrical heating assembly of claim 1, wherein at least one of the plurality of heating wires comprises at least one material selected from stainless steels, carbon steels, high-resistance metal alloys, and metals.

13. The electrical heating assembly of claim 1, wherein the support structure comprises a fabric with at least one of the plurality of heating wires fixed to the support structure by a thread.

14. The electrical heating assembly of claim 1, further comprising a temperature controller.

15. The electrical heating assembly of claim 1, wherein the electrical heating assembly is adapted for fitting in at least one of a seat bottom and a seat back of a vehicle seat.

16. The electrical heating assembly of claim 9, wherein each filament of the stranded wire is covered by an insulating coating.

17. The electrical heating assembly of claim 12, wherein at least one of the plurality of heating wires comprises copper.

* * * * *